United States Patent
Schwarz et al.

(10) Patent No.: US 10,358,932 B2
(45) Date of Patent: Jul. 23, 2019

(54) SEGMENTED NON-CONTACT SEAL ASSEMBLY FOR ROTATIONAL EQUIPMENT

(71) Applicant: United Technologies Corporation, Hartford, CT (US)

(72) Inventors: Frederick M. Schwarz, Glastonbury, CT (US); William K. Ackermann, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 544 days.

(21) Appl. No.: 14/754,161

(22) Filed: Jun. 29, 2015

(65) Prior Publication Data

US 2016/0376904 A1  Dec. 29, 2016

(51) Int. Cl.
| | | |
|---|---|---|
| *F01D 11/00* | (2006.01) | |
| *F01D 11/02* | (2006.01) | |
| *F16J 15/44* | (2006.01) | |

(52) U.S. Cl.
CPC ........... *F01D 11/02* (2013.01); *F01D 11/001* (2013.01); *F01D 11/025* (2013.01); *F16J 15/44* (2013.01); *F16J 15/442* (2013.01); *F05D 2220/323* (2013.01); *F05D 2240/55* (2013.01); *F05D 2240/56* (2013.01); *F05D 2260/36* (2013.01)

(58) Field of Classification Search
CPC ...... F01D 11/00; F01D 11/001; F01D 11/003; F01D 11/02; F01D 11/025; F16J 15/442; F16J 15/44
See application file for complete search history.

(56) References Cited

U.S. PATENT DOCUMENTS

| | | | | |
|---|---|---|---|---|
| 4,998,739 A | * | 3/1991 | Weiler | .................. F16J 15/441 |
| | | | | 277/422 |
| 5,114,159 A | * | 5/1992 | Baird | ........................ F01D 5/10 |
| | | | | 277/355 |
| 5,451,116 A | * | 9/1995 | Czachor | .................. F01D 9/065 |
| | | | | 403/28 |
| 5,593,278 A | | 1/1997 | Jourdain et al. | |
| 5,810,365 A | | 9/1998 | Brandon et al. | |
| 5,934,684 A | * | 8/1999 | Brandon | ................ F16J 15/442 |
| | | | | 277/421 |

(Continued)

FOREIGN PATENT DOCUMENTS

| | | |
|---|---|---|
| EP | 1269048 | 1/2006 |
| EP | 2137383 | 12/2009 |

(Continued)

OTHER PUBLICATIONS

EP search report for EP16176979.9 dated Oct. 27, 2016.
EP office action for EP16176979.9 dated May 20, 2019.

*Primary Examiner* — Richard A Edgar
*Assistant Examiner* — Elton K Wong
(74) *Attorney, Agent, or Firm* — O'Shea Getz P.C.

(57) ABSTRACT

An assembly is provided for rotational equipment. The assembly includes a circumferentially segmented stator and a rotor radially within the stator. The assembly also includes a seal assembly configured for substantially sealing a gap radially between the stator and the rotor. The seal assembly includes a carrier and a non-contact seal seated with the carrier. The carrier includes a plurality of discrete carrier segments circumferentially arranged around the non-contact seal.

19 Claims, 11 Drawing Sheets

(56) References Cited

U.S. PATENT DOCUMENTS

| | | | |
|---|---|---|---|
| 6,129,512 A * | 10/2000 | Agram | F01D 17/162 |
| | | | 415/160 |
| 6,318,728 B1 | 11/2001 | Addis et al. | |
| 6,428,009 B2 | 8/2002 | Justak | |
| 7,182,345 B2 | 2/2007 | Justak | |
| 7,410,173 B2 | 8/2008 | Justak | |
| 7,797,941 B2 | 9/2010 | Munsell | |
| 7,896,352 B2 | 3/2011 | Justak | |
| 7,927,069 B2 | 4/2011 | Erickson et al. | |
| 8,002,285 B2 | 8/2011 | Justak | |
| 8,105,021 B2 | 1/2012 | Glahn | |
| 8,109,716 B2 | 2/2012 | Glahn | |
| 8,109,717 B2 | 2/2012 | Glahn | |
| 8,167,545 B2 | 5/2012 | Glahn | |
| 8,172,232 B2 | 5/2012 | Justak | |
| 8,240,986 B1 * | 8/2012 | Ebert | F01D 11/001 |
| | | | 415/173.2 |
| 2002/0000694 A1 | 1/2002 | Justak | |
| 2004/0150164 A1 * | 8/2004 | Morgan | F01D 11/001 |
| | | | 277/345 |
| 2004/0217549 A1 | 11/2004 | Justak | |
| 2006/0285971 A1 * | 12/2006 | Matheny | F01D 11/22 |
| | | | 415/173.1 |
| 2007/0018409 A1 | 1/2007 | Justak | |
| 2007/0096397 A1 | 5/2007 | Justak | |
| 2007/0120327 A1 | 5/2007 | Justak | |
| 2007/0212215 A1 | 9/2007 | Ferber et al. | |
| 2008/0048398 A1 * | 2/2008 | Baird | F01D 11/003 |
| | | | 277/355 |
| 2008/0100000 A1 | 5/2008 | Justak | |
| 2008/0136115 A1 * | 6/2008 | Johnson | F01D 11/001 |
| | | | 277/415 |
| 2008/0246223 A1 * | 10/2008 | Justak | F01D 11/02 |
| | | | 277/411 |
| 2008/0265513 A1 | 10/2008 | Justak | |
| 2011/0121519 A1 | 5/2011 | Justak | |
| 2014/0255194 A1 | 9/2014 | Jones | |
| 2015/0132124 A1 | 5/2015 | Albers et al. | |
| 2017/0009596 A1 * | 1/2017 | Schwarz | B64D 27/10 |

FOREIGN PATENT DOCUMENTS

| | | |
|---|---|---|
| EP | 2279364 | 2/2011 |
| EP | 1654484 | 4/2011 |
| WO | 2001075339 | 7/2002 |
| WO | 2005001316 | 1/2005 |
| WO | 2008094761 | 8/2008 |
| WO | 2009138787 | 12/2009 |
| WO | 2009146258 | 12/2009 |

* cited by examiner

SEGMENTED NON-CONTACT SEAL ASSEMBLY FOR ROTATIONAL EQUIPMENT

BACKGROUND OF THE INVENTION

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal, however, can generate a significant quantity of heat which can reduce efficiency of the rotational equipment as well as subject other components of the rotational equipment to high temperatures. To accommodate the high temperatures, other components of the rotational equipment may be constructed from specialty high temperature materials, which can significantly increase the manufacturing and servicing costs of the rotational equipment. While non-contact seals have been developed in an effort to reduce heat within rotational equipment, such non-contact seals can be difficult to configure within the rotational equipment. Such non-contact seals may also need to be replaced when incidental contact occurs.

There is a need in the art for improved seal assemblies for rotational equipment.

SUMMARY OF THE DISCLOSURE

According to an aspect of the present disclosure, an assembly is provided for rotational equipment. The assembly includes a circumferentially segmented stator and a rotor radially within the stator. The assembly also includes a seal assembly configured for substantially sealing a gap radially between the stator and the rotor. The seal assembly includes a carrier and a non-contact seal seated with the carrier. The carrier includes a plurality of discrete carrier segments circumferentially arranged around the non-contact seal.

According to another aspect of the present disclosure, an aircraft propulsion system is provided that includes a gas turbine engine which includes a compressor section. The compressor section includes a circumferentially segmented stator and a rotor radially within the stator. The compressor section also includes a seal assembly arranged within a gap radially between the stator and the rotor. The seal assembly includes a circumferentially segmented carrier and a non-contact seal seated with the carrier. The non-contact seal is positioned directly radially above and is axially aligned with a seal portion of the rotor having a cylindrical surface.

According to still another aspect of the present disclosure, an assembly is provided for a gas turbine engine. The assembly includes an annular fairing and a plurality of vanes arranged circumferentially around and engaged with the fairing. The assembly also includes a rotor and a seal assembly. The rotor includes a disk, a plurality of rotor blades arranged around the disk, and an annular linkage extending axially from the disk. The seal assembly is configured in a gap formed between the fairing and the linkage. The seal assembly includes a base, a plurality of shoes and a plurality of spring elements. The base is mounted to the fairing and includes a plurality of discrete base segments arranged circumferentially around a centerline. The shoes are circumferentially arranged around and radially adjacent the linkage. Each of the spring elements is radially between and connects a respective one of the shoes to the base.

A carrier may be included which mounts the base to the fairing. The carrier includes a plurality of carrier segments circumferentially arranged around the centerline. A case may also be included which circumscribes the vanes and the rotor. The case includes plurality of case segments circumferentially arranged around the centerline. A seam between an adjacent pair of the case segments is circumferentially aligned with a seam between an adjacent pair of the carrier segments.

A first of the carrier segments may circumferentially extend approximately one-hundred and eighty degrees around a centerline.

Each of the carrier segments may be configured as an arcuate carrier segment.

A first of the carrier segments may be positioned circumferentially adjacent to and removably attached to a second of the carrier segments.

A first of the carrier segments may be circumferentially adjacent to a second of the carrier segments. The first and the second carrier segments may be mated together by a male-female connection.

The first of the carrier segments may include a base and a connector which projects laterally into an aperture in the second of the carrier segments to provide the male-female connection.

The carrier may include a fastener which secures the connector to the second of the carrier segments.

The carrier may include a connector which extends in a first lateral direction into an aperture in the first of the carrier segments to provide the male-female connection. The connector may extend in a second lateral direction into an aperture in the second of the carrier segments to provide a second male-female connection.

The stator may include or be configured as a fairing configured to form an axial portion of an inner peripheral boundary of a core gas path through the rotational equipment. The rotational equipment may be configured as a gas turbine engine.

A variable vane may be included which includes a shaft. The shaft may project radially into an aperture in the fairing.

The shaft may also project radially into an aperture in the carrier.

The non-contact seal may be positioned directly radially above and may be axially aligned with a seal portion of the rotor having a cylindrical surface.

The seal portion of the rotor may be radially thicker than adjacent portions of the rotor.

The seal portion of the rotor may have a hardface which forms the cylindrical surface.

The non-contact seal may be a hydrostatic non-contact seal.

The non-contact seal may include a base, a plurality of shoes and a plurality of spring elements. The base may be seated with the carrier. The shoes may be circumferentially arranged about and radially adjacent the rotor. Each of the spring elements may be radially between and connect a respective one of the shoes to the base.

The base may include a plurality of discrete base segments arranged circumferentially around a centerline.

The foregoing features and the operation of the invention will become more apparent in light of the following description and the accompanying drawings.

DETAILED DESCRIPTION OF THE INVENTION

Figure 1:
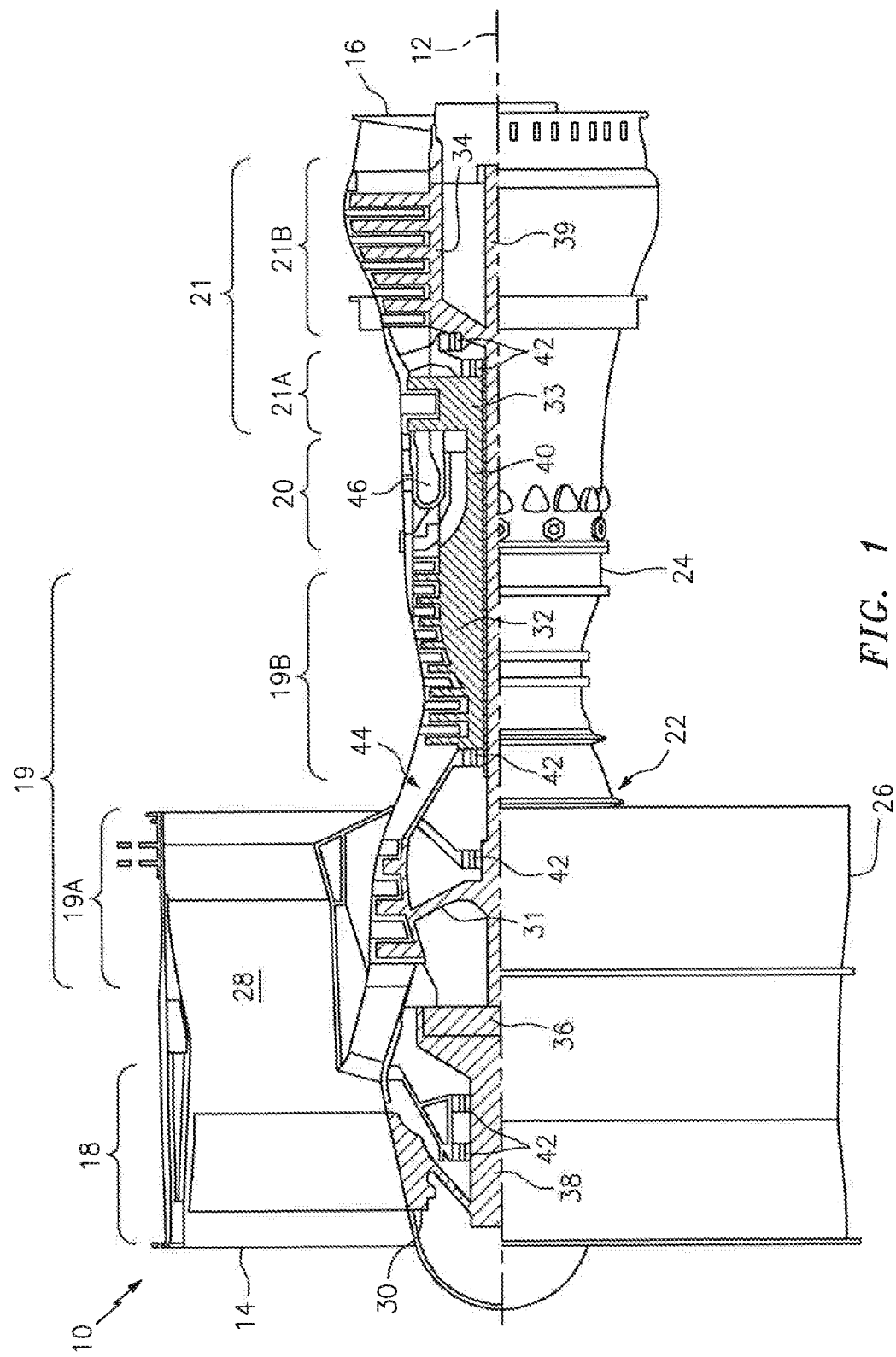
FIG. 1 is a side cutaway illustration of a gas turbine engine.

FIG. 1 is a side cutaway illustration of a gas turbine engine 10 for an aircraft propulsion system. This turbine engine 10 is configured as a geared turbofan engine, and extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. This housing 22 includes an inner case 24 (e.g., a core case) and an outer case 26 (e.g., a fan case). The inner case 24 may house one or more of the engine sections 19-21 (e.g., an engine core), and may be housed within an inner nacelle/inner fixed structure (not shown) which provides an aerodynamic cover for the inner case 24. The inner case 24 may be configured with one or more axial and/or circumferential inner sub-casings; e.g., case segments. The outer case 26 may house at least the fan section 18, and may be housed within an outer nacelle (not shown) which provides an aerodynamic cover for the outer case 26. Briefly, the outer nacelle along with the outer case 26 overlaps the inner nacelle thereby defining a bypass gas path 28 radially between the nacelles. The outer case 26 may be configured with one or more axial and/or circumferential outer case segments.

Each of the engine sections 18-19B, 21A and 21B includes a respective rotor 30-34. Each of these rotors 30-34 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 30 is connected to a gear train 36, for example, through a fan shaft 38. The gear train 36 and the LPC rotor 31 are connected to and driven by the LPT rotor 34 through a low speed shaft 39. The HPC rotor 32 is connected to and driven by the HPT rotor 33 through a high speed shaft 40. The shafts 38-40 are rotatably supported by a plurality of bearings 42; e.g., rolling element and/or thrust bearings. Each of these bearings 42 is connected to the engine housing 22 (e.g., the inner case 24) by at least one stationary structure such as, for example, an annular support strut.

During operation, air enters the turbine engine 10 through the airflow inlet 14. This air is directed through the fan section 18 and into a core gas path 44 and the bypass gas path 28. The core gas path 44 extends sequentially through the engine sections 19-21. The air within the core gas path 44 may be referred to as "core air". The air within the bypass gas path 28 may be referred to as "bypass air".

The core air is compressed by the compressor rotors 31 and 32 and directed into a combustion chamber 46 of a combustor in the combustor section 20. Fuel is injected into the combustion chamber 46 and mixed with the compressed core air to provide a fuel-air mixture. This fuel air mixture is ignited and combustion products thereof flow through and sequentially cause the turbine rotors 33 and 34 to rotate. The rotation of the turbine rotors 33 and 34 respectively drive rotation of the compressor rotors 32 and 31 and, thus, compression of the air received from a core airflow inlet. The rotation of the turbine rotor 34 also drives rotation of the fan rotor 30, which propels bypass air through and out of the bypass gas path 28. The propulsion of the bypass air may account for a majority of thrust generated by the turbine engine 10, e.g., more than seventy-five percent (75%) of engine thrust. The turbine engine 10 of the present disclosure, however, is not limited to the foregoing exemplary thrust ratio.

Figure 2:
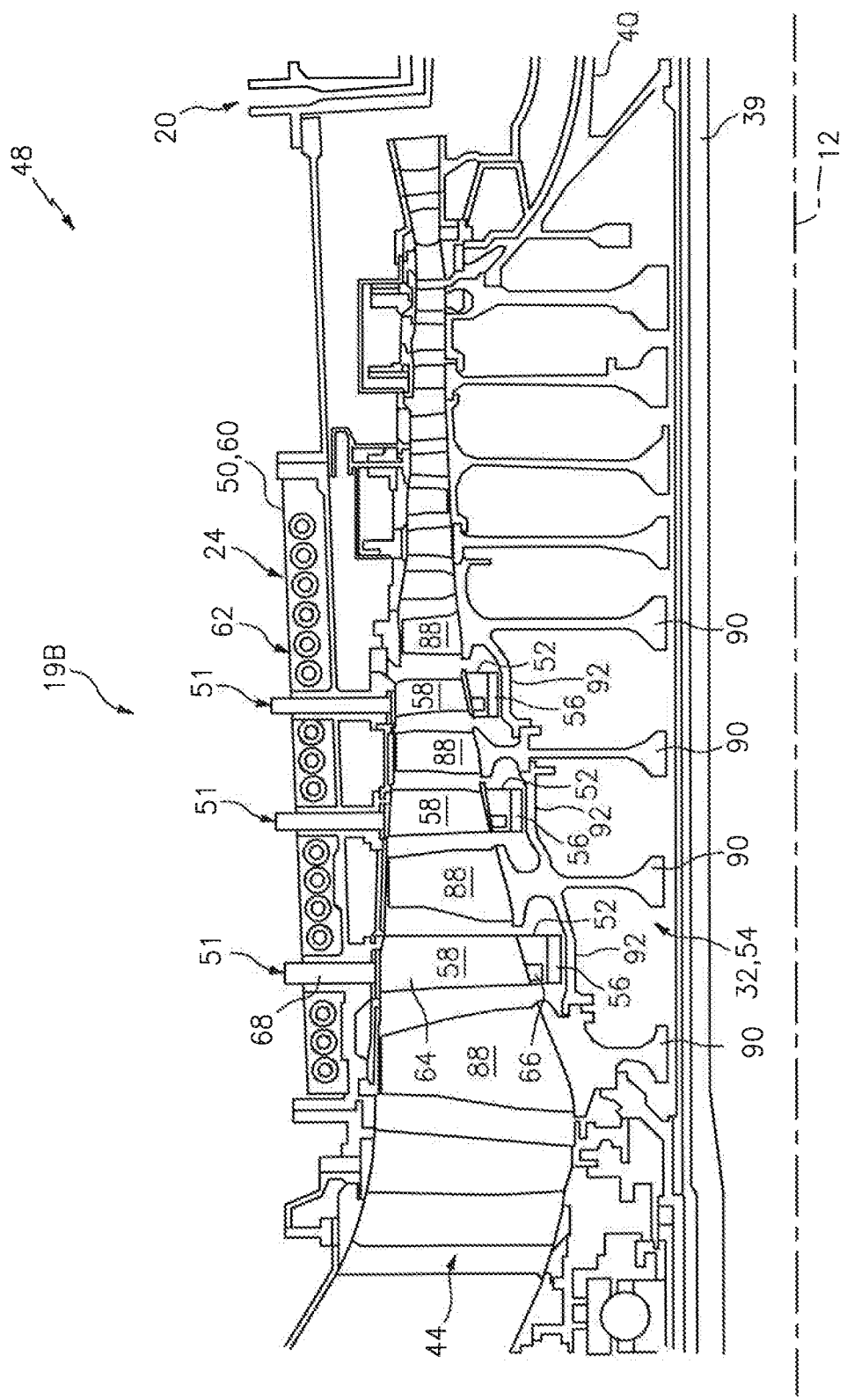
FIG. 2 is a side sectional illustration of a portion of a high pressure compressor (HPC) section.

FIG. 2 illustrates an assembly 48 for the turbine engine 10. This turbine engine assembly 48 includes an assemblage of stator elements 50-52, a rotor 54 and one or more non-contact seal assemblies 56.

The assemblage of stator elements includes a turbine engine case 50, one or more arrays 51 of stators vanes 58 and one or more stators 52. The turbine engine case 50 may be configured as a component of the inner case 24. For example, the turbine engine case 50 of FIG. 2 is configured as an axial tubular sub-casing (e.g., segment) of the inner case 24, which houses at least some (or alternatively all) of the HPC rotor 32.

Figure 3:
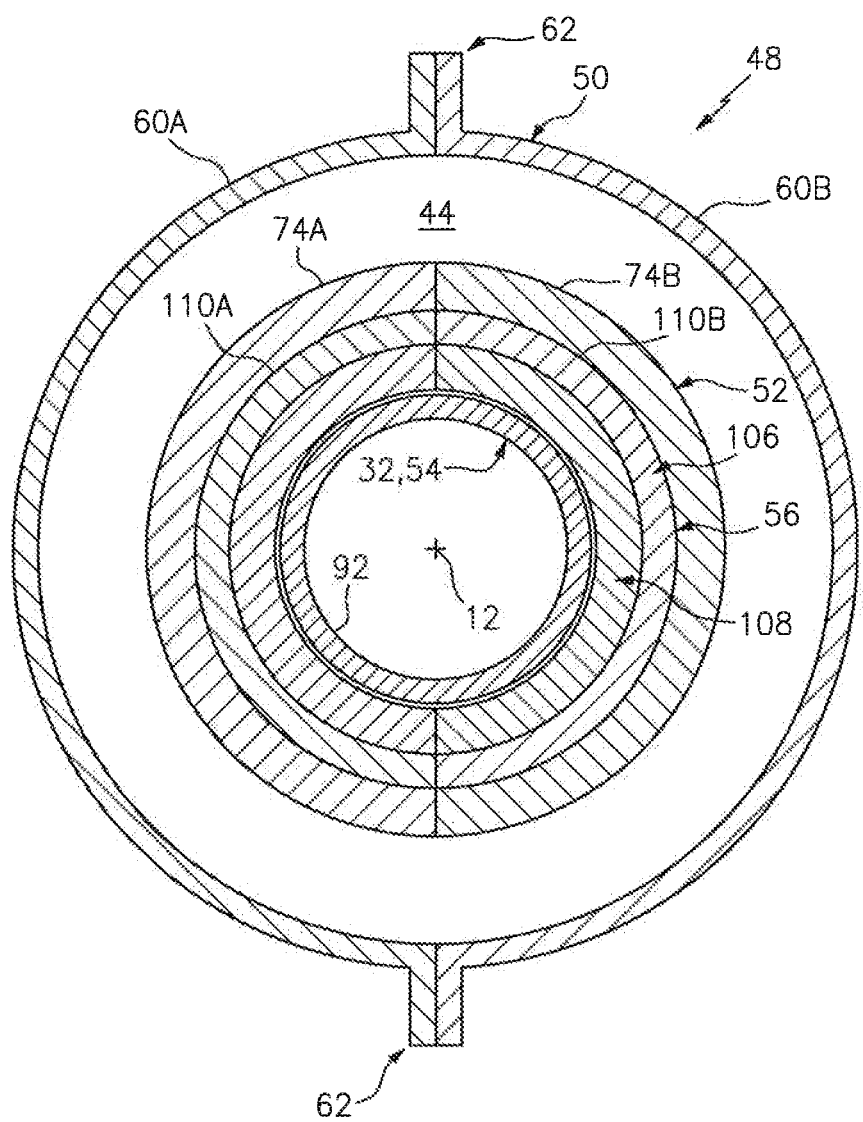
FIG. 3 is a cross-sectional block diagram of the HPC section of FIG. 2 with its stator vanes removed for ease of illustration.

Referring to FIG. 3, the turbine engine case 50 may be a circumferentially segmented case. The turbine engine case 50 of FIG. 3, in particular, includes a plurality of discrete, arcuate case segments 60 (e.g., 60A and 60B). Each of these case segments 60A and 60B may extend circumferentially approximately one-hundred and eighty degrees (180°) around the centerline 12; e.g., each case segment 60 may form one half of the turbine engine case 50. However, in alternative embodiments, one or more of the case segments 60 may be less than one-hundred and eighty degrees (180°) and/or the turbine engine case 50 may include more than two discrete case segments 60. Referring to FIGS. 2 and 3, adjacent case segments 60A and 60B are removably attached to one another by, for example, a bolted flange connection 62. However, other inter-case segment connections are also contemplated by the present disclosure.

Referring to FIG. 2, each array 51 of stator vanes 58 includes a plurality of stator vanes 58. These stator vanes 58 are arranged circumferentially around the centerline 12 and radially between the rotor 54 and the turbine engine case 50. Each of the stator vanes 58 extends radially from a respective one of the stators 52 to the turbine engine case 50.

Each of the stator vanes 58 of FIG. 2 is configured as a variable stator vane. Here, the term "variable stator vane" may describe a stator vane which may pivot about an axis, which extends generally radially out from a centerline of an engine. Each of the stator vanes 58 of FIG. 2, for example, includes an airfoil 64, an inner shaft 66 and an outer shaft 68. The inner shaft 66 is connected to and extends radially inward from an inner end of the airfoil 64. The outer shaft 68 is connected to and extends radially outward from an outer end of the airfoil 64. The inner and outer shafts 66 and 68 are co-axial about a common axis. The inner and the outer shafts 66 and 68 are respectively rotatably mounted to a respective one of the stators 52 and the turbine engine case 50. The present disclosure, however, is not limited to any particular type or configuration of stator vanes 58. For example, in alternative embodiments, one or more or all of the stator vanes 58 in one or more of the arrays 51 may each be configured as a fixed stator vane, which is fixedly attached to its respective stator and/or the turbine engine case 50.

Figure 4:
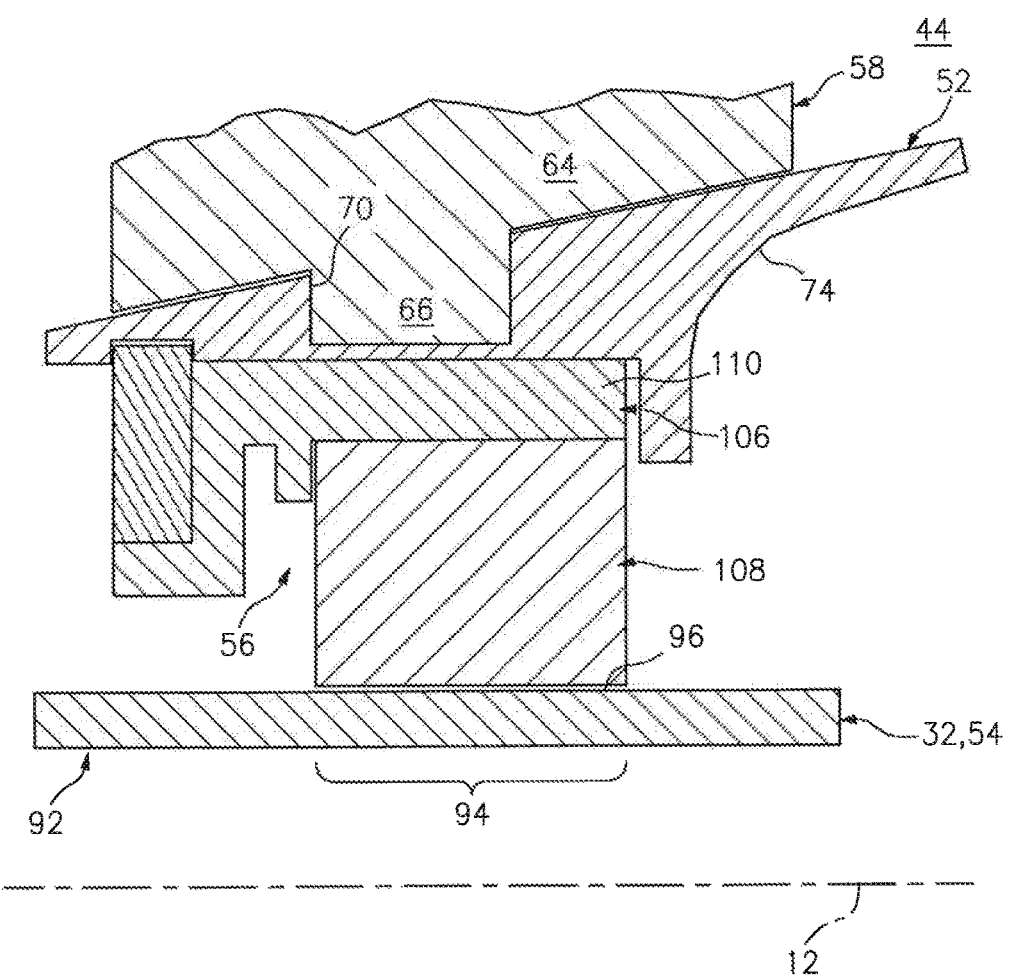
FIG. 4 is a side-sectional block diagram of a portion of the HPC section of FIG. 2.
Figure 5:
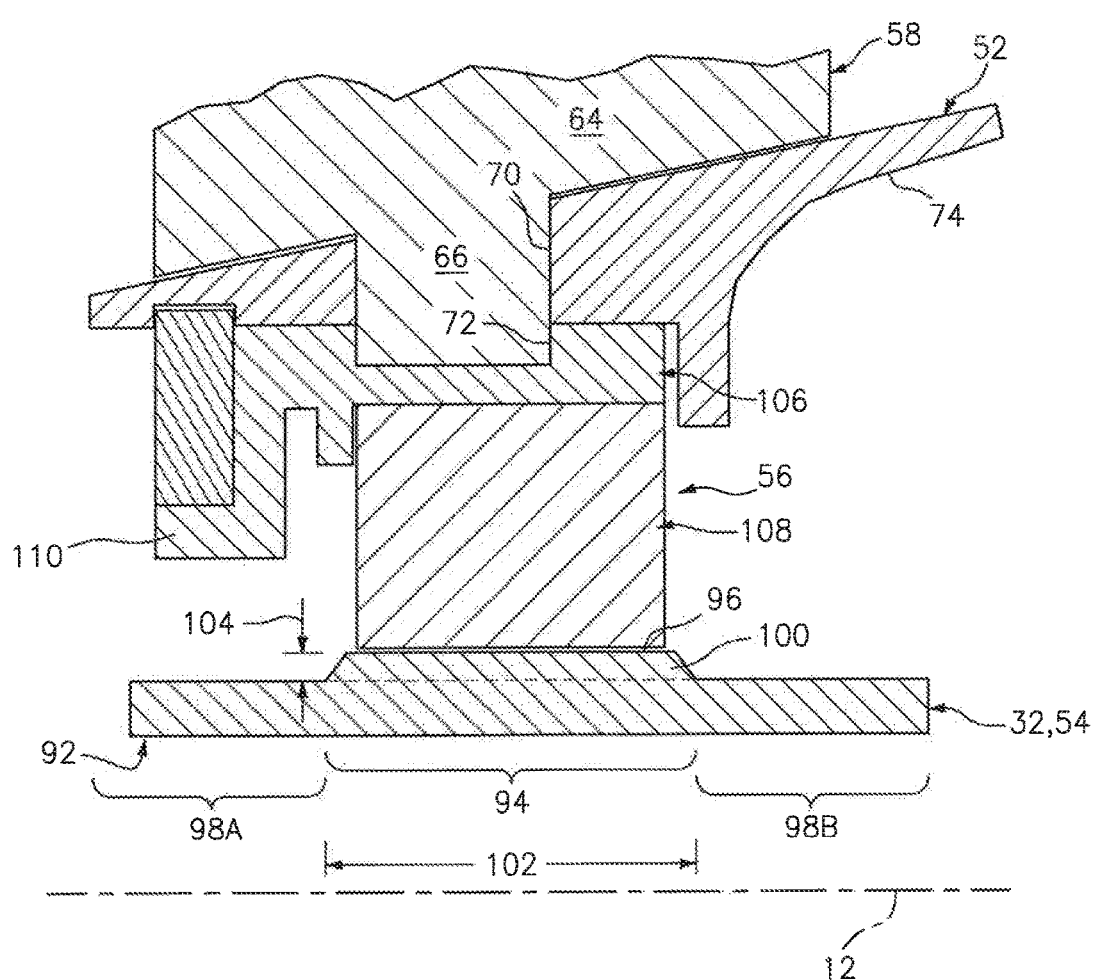
FIG. 5 is a side-sectional block diagram of a portion of an alternative HPC section.

Referring now to FIG. 4, each of the stators 52 is or includes a fairing configured to form an axial portion of an inner peripheral boundary of the core gas path 44. Each stator 52 includes a plurality of apertures 70 configured to respectively receive the inner shafts 66 of the stator vanes 58. The aperture 70 shown in FIG. 4 extends partially radially into the stator 52. However, in other embodiments as shown in FIG. 5, the aperture 70 may extend radially through the stator 52. In this manner, the inner shaft 66 may project radially through the stator 52 and, for example, into an aperture 72 in a respective one of the seal assemblies 56.

Referring to FIG. 3, one or more of the stators 52 may be a circumferentially segmented stator. The stator of FIG. 3, in particular, includes a plurality of discrete, arcuate stator segments 74 (e.g., 74A and 74B). Each of these stator segments 74A and 74B may extend circumferentially approximately one-hundred and eighty degrees (180°) around the centerline 12; e.g., each stator segment 74A, 74B may form one half of the respective stator 52. However, in alternative embodiments, one or more of the stator segments 74 may be less than one-hundred and eighty degrees (180°) and/or the stator 52 may include more than two discrete stator segments 74.

Figure 6:
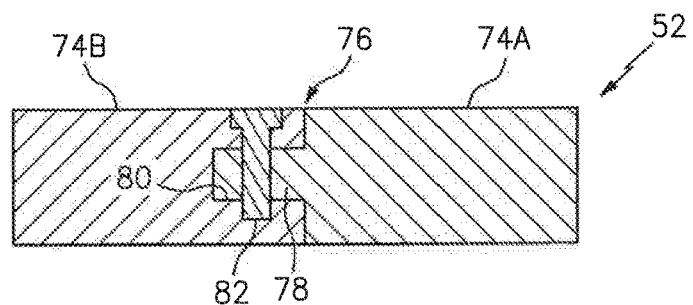
FIGS. 6 and 7 illustrate connections between adjacent stator segments.
Figure 7:
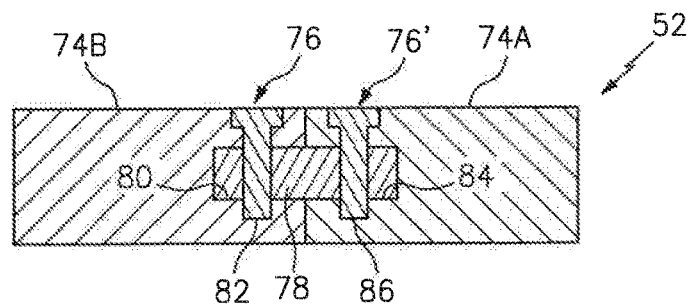

Referring to FIGS. 6 and 7, adjacent stator segments 74 are removably attached to one another by, for example, at least one male-female connection 76. The male-female connection 76 of FIG. 6, for example, includes a connector 78 such as a protrusion which projects laterally (e.g., circumferentially or tangentially) out from an end of the first stator segment 74A and into an aperture 80 in an adjacent end of the second stator segment 74B. The connector 78 and the aperture 80 may be sized to provide a snug and/or interference fit between the connector 78 and the second stator segment 74B. In addition or alternatively, a fastener 82 such as a screw or bolt or pin may be configured to removably secure the connector 78 to the second stator segment 74B.

The connector 78 may be configured integral with the first stator segment 74A as shown in FIG. 6. Alternatively, the connector 78 may be configured discrete from the first stator segment 74A as shown in FIG. 7. The connector 78, for example, may be configured as a pin or biscuit which projects laterally in opposite directions into apertures 80 and 84 in the first and the second stator segments 74A and 74B. Again, the connector 78 and one or more of the apertures 80 and 84 may be sized to provide a snug and/or interference fit between the connector 78 and the respective stator segment 74. In addition or alternatively, a fastener 86 may be configured to removably secure the connector 78 to the respective stator segment 74. Of course, other inter-stator segment connections are also contemplated by the present disclosure.

With the foregoing configurations, the male-female connection(s) 76, 76' may join the stator segments 74 together and functionally provide a unitary body. In this manner, the male-female connection(s) 76, 76' may significantly reduce or eliminate buckling or shingling between the segments 74 which can be seen in other segmented bodies as a result of non-uniform thermal distortion. More particularly, the male-female connections 76, 76' may enable the stator 52 to deform more uniformly in a similar manner to a unitary and integrally formed full-hoop body.

Referring to FIG. 2, the rotor 54 may be configured as or included in one of the rotors 30-34; e.g., the HPC rotor 32. This rotor 54 includes one or more arrays of rotor blades 88, one or more rotor disks 90 and one or more annular linkages 92. Each array of rotor blades 88 includes a plurality of rotor blades, which are arranged circumferentially around and connected to the respective rotor disk 90. Each array of rotor blades 88 is positioned axially between neighboring arrays 51 of stator vanes 58.

Each of the linkages 92 is configured to connect neighboring rotor disks 90 to one another. Of course, in other embodiments, one or more of the linkages 92 may connect the rotor disk 90 to another component of the turbine engine 10 such as, for example, the high speed shaft. Referring to FIG. 4, each of the linkages 92 includes a seal portion 94 with an outer cylindrical surface 96. This seal portion 94 may have substantially the same radial thickness as other portions of the linkage 92.

Referring to FIG. 5, the seal portion 94 may alternatively be radially thicker than one or more adjacent portions 98A and 98B of the linkage 92. This additional thickness (e.g., seal region 100) may be provided by, for example, building up linkage material on or by forming a hardface on a base portion of the linkage 92, where the material buildup or the hardface form the cylindrical surface 96. In another example, the hardface may by formed on the buildup of material, wherein the hardface material has a hardness value different than and harder than the base linkage material. This hardface material may be the same material as the base linkage material where, for example, that portion of the material is (e.g., heat) treated to increase its hardness. Alternatively, the hardface material may be different than the base linkage material beneath.

The seal portion 94 of FIG. 5 has an axial length 102 that is greater than its radial thickness 104. In general, the axial length 102 is greater than an axial length of the non-contact seal assembly 56. With the foregoing configuration of FIG. 5, the linkage 92 may accommodate infrequent periodic contact with a respective one of the non-contact seal assemblies 56, where such contact may wear away the material of the linkage 92. This additional thickness may reduce internal stress concentrations within the linkage material caused by wear from periodic contact with the assembly 56. Furthermore, the additional thickness of the seal region 100 may be restored during a rebuild process by filling in wear grooves with additional material and/or removing some or all of the worn seal region 100 and forming a new seal region 100 in its place. This in turn may prolong the useful life of the linkage 92. The hardface may also provide a barrier to prevent incidental wear from progressing into a crack in the linkage 92.

Referring to FIGS. 3 and 4, each of the seal assemblies 56 is arranged in a radial gap between a respective one of the stators 52 and a respective one of the linkages 92. Each of the seal assemblies 56 is configured to substantially seal the respective gap. The seal assembly 56 of FIGS. 3 and 4, for example, includes an annular carrier 106 and an annular non-contact seal 108 such as, but not limited to, a hydrostatic non-contact seal.

The carrier 106 is configured to mount the non-contact seal 108 to the respective stator 52. The carrier 106 may be configured as a circumferentially segmented carrier. The carrier 106 of FIG. 3, in particular, includes a plurality of discrete, arcuate carrier segments 110 (e.g., 110A and 110B). Each of these carrier segments 110 may extend circumferentially approximately one-hundred and eighty degrees (180°) around the centerline 12; e.g., each carrier segment 110 may form one half of the respective carrier 106. However, in alternative embodiments, one or more of the carrier segments 110 may be less than one-hundred and eighty degrees (180°) and/or the carrier 106 may include more than two discrete carrier segments 110.

Figure 8:
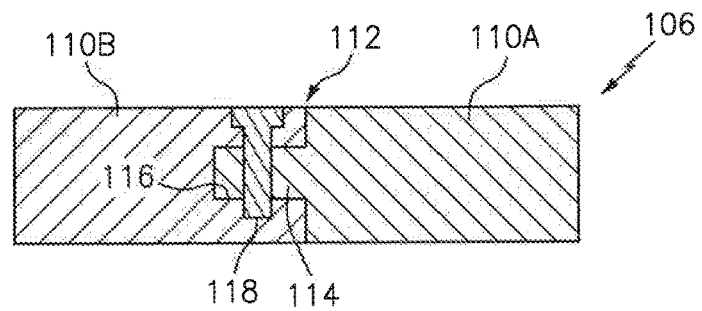
FIGS. 8 and 9 illustrate connections between adjacent carrier segments.
Figure 9:
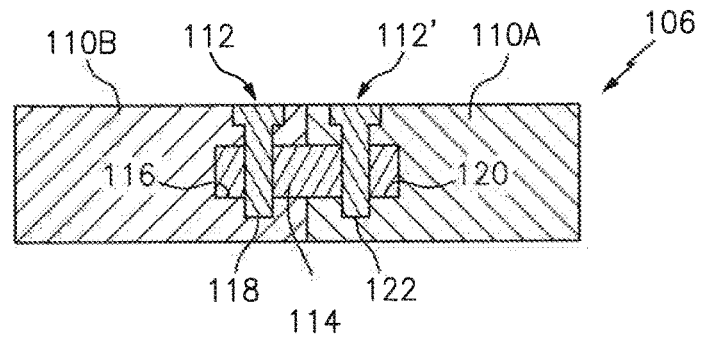

Referring to FIGS. 8 and 9, adjacent carrier segments 110 are removably attached to one another by, for example, at least one male-female connection 112. The male-female connection 112 of FIG. 8, for example, includes a connector 114 such as a protrusion which projects laterally (e.g., circumferentially or tangentially) out from an end of the first carrier segment 110A and into an aperture 116 in an adjacent end of the second carrier segment 110B. The connector 114 and the aperture 116 may be sized to provide a snug and/or interference fit between the connector 114 and the second carrier segment 110B. In addition or alternatively, a fastener 118 such as a screw or bolt or pin may be configured to removably secure the connector 114 to the second carrier segment 110B.

The connector 114 may be configured integral with the first carrier segment 110A as shown in FIG. 6. Alternatively, the connector 114 may be configured discrete from the first carrier segment 110A as shown in FIG. 7. The connector 114, for example, may be configured as a pin or biscuit which projects laterally in opposite directions into apertures 116 and 120 in the first and the second carrier segments 110A and 110B. Again, the connector 114 and one or more of the apertures 116 and 120 may be sized to provide a snug and/or interference fit between the connector 114 and the respective carrier segment 110. In addition or alternatively, a fastener 118, 122 may be configured to removably secure the connector 114 to the respective carrier segment 110. Of course, other inter-carrier segment connections are also contemplated by the present disclosure.

With the foregoing configurations, the male-female connection(s) 112, 112' may join the carrier segments 110 together and functionally provide a unitary body. In this manner, the male-female connection(s) 112, 112' may significantly reduce or eliminate buckling or shingling between the segments 110 which can be seen in other segmented bodies as a result of non-uniform thermal distortion. More particularly, the male-female connection(s) 112, 112' may enable the carrier 106 to deform more uniformly in a similar manner to a unitary and integrally formed full-hoop body.

Referring initially to FIGS. 10-13, the non-contact seal 108 includes one or more circumferentially spaced shoes 126 which are located in a non-contact position along the cylindrical surface 96 of the respective linkage 92. Each shoe 126 is formed with a sealing surface 128 and a slot 130 extending radially inwardly toward the sealing surface 128.

Figure 10:
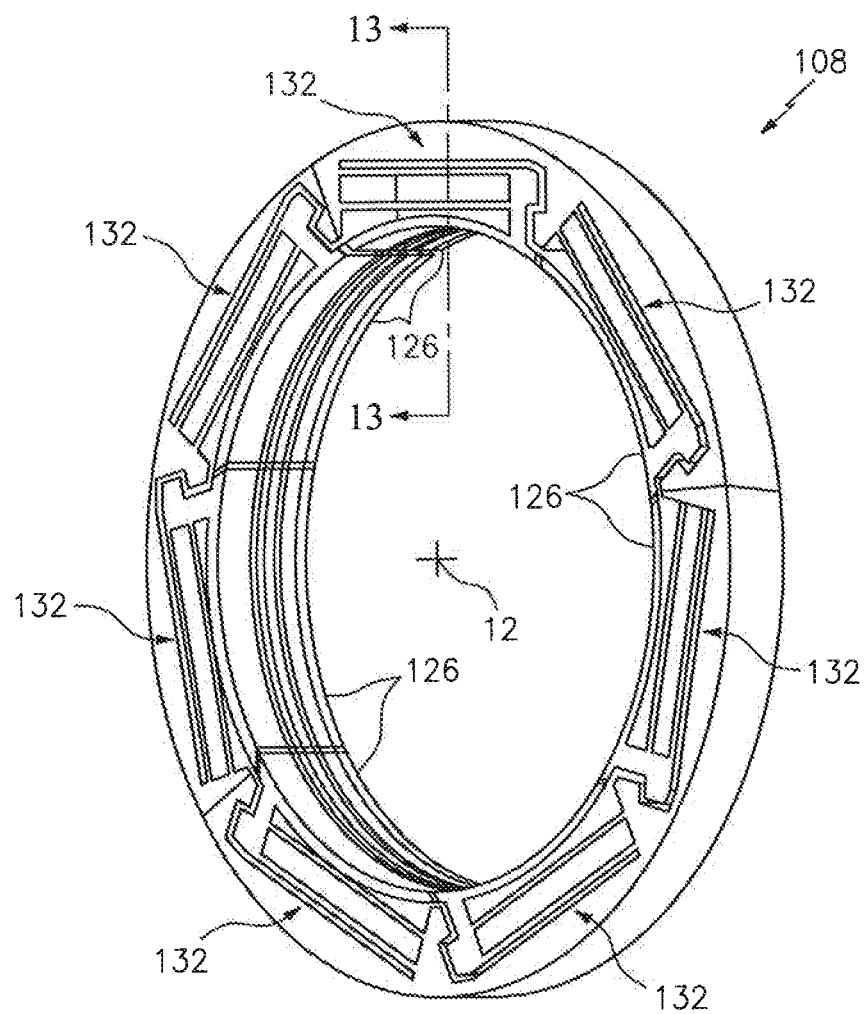
FIG. 10 is a perspective illustration of a non-contact seal.
Figure 11:
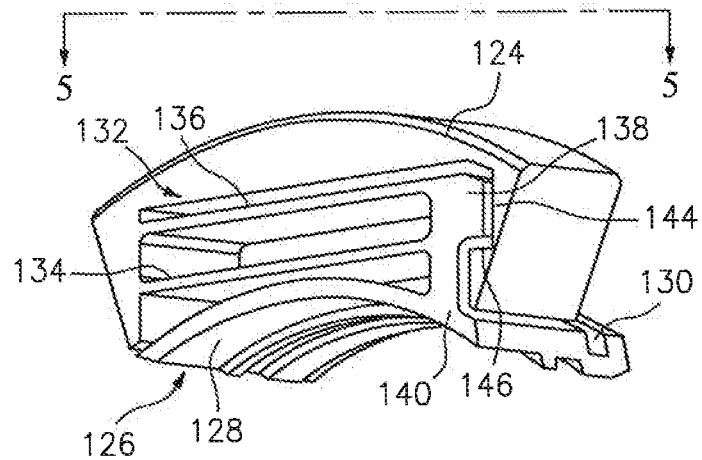
FIG. 11 is a perspective illustration of a portion of the non-contact seal of FIG. 10.

Under some operating conditions, particularly at higher pressures, it may be desirable to limit the extent of radial movement of the shoes 126 with respect to the rotor 54 to maintain tolerances; e.g., the spacing between the shoes 126 and the cylindrical surface 96. The non-contact seal 108 includes one or more circumferentially spaced spring elements 132, the details of one of which are best seen in FIGS. 10 and 11. Each spring element 132 is formed with an inner band 134 and an outer band 136 radially outwardly spaced from the inner band 134. One end of each of the bands 134 and 136 is mounted to or integrally formed with a stationary base 124 of the seal and the opposite end thereof is connected to a first stop 138. This base may be configured as a circumferentially segmented body as best seen in FIG. 10. Each segment of the base may be connected to an adjacent segment of the base using a similar male-female connection technique as already described above with reference to FIGS. 6 to 9. Furthermore, the seams between one or more of the base segments may be circumferentially aligned with respective seams between the carrier segments and/or the stator segments as generally shown in FIG. 3. Of course, the present disclosure is not limited to the aforesaid exemplary configuration.

Figure 12:
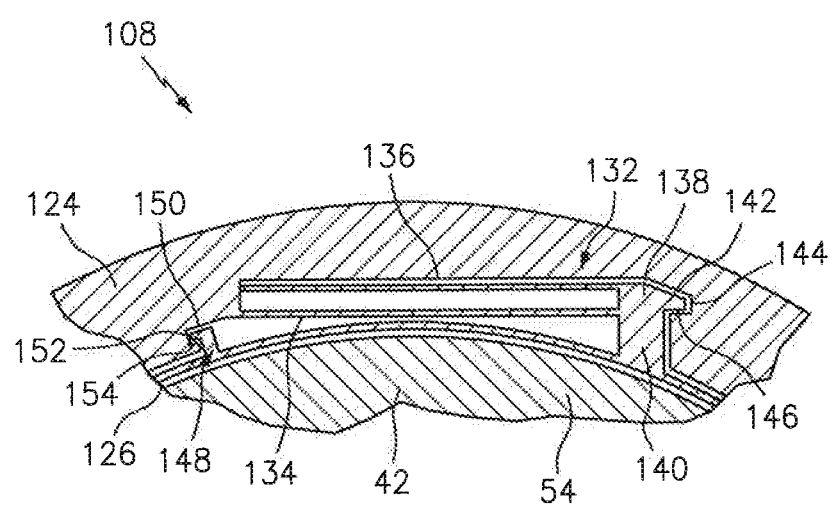
FIG. 12 is a cross-sectional illustration of a portion of the non-contact seal of FIG. 10.

The first stop 138 includes a strip 140 which is connected to a shoe 126 (one of which is shown in FIGS. 11 and 12), and has an arm 142 opposite the shoe 126 which may be received within a recess 144 formed in the base 124. The recess 144 has a shoulder 146 positioned in alignment with the arm 142 of the first stop 138.

A second stop 148 is connected to or integrally formed with the strip 140 and is connected to the shoe 126. The second stop 148 is circumferentially spaced from the first stop 138 in a position near the point at which the inner and outer bands 134 and 136 connect to the base 124. The second stop 148 is formed with an arm 150 which may be received within a recess 152 in the base 124. The recess 152 has a shoulder 154 positioned in alignment with the arm 150 of second stop 148.

During operation, aerodynamic forces may be developed which apply a fluid pressure to the shoe 126 causing it to move radially with respect to the respective linkage 92. The fluid velocity increases as the gap 156 between the shoe 126 and respective linkage 92 increases, thus reducing pressure in the gap 156 and drawing the shoe 126 radially inwardly toward the rotor 54. As the seal gap 156 closes, the velocity decreases and the pressure increases within the seal gap 156 thus forcing the shoe 126 radially outwardly from the rotor 54. The spring elements 132 deflect and move with the shoe 126 to create a primary seal of the circumferential gap 156 between the rotor 54 and base 124 within predetermined design tolerances. The first and second stops 138 and 148 may limit the extent of radially inward and outward movement of the shoe 126 with respect to the rotor 54 for safety and operational limitation. A gap is provided between the arm 142 of first stop 138 and the shoulder 146, and between the arm 150 of second stop 148 and shoulder 154, such that the shoe 126 can move radially inwardly relative to the rotor 54. Such inward motion is limited by engagement of the arms 142, 150 with shoulders 146 and 154, respectively, to prevent the shoe 126 from contacting the rotor 54 or exceeding design tolerances for the gap between the two. The arms 142 and 150 also contact the base 124 in the event the shoe 126 moves radially outwardly relative to the rotor 54, to limit movement of the shoe 126 in that direction.

Figure 13:
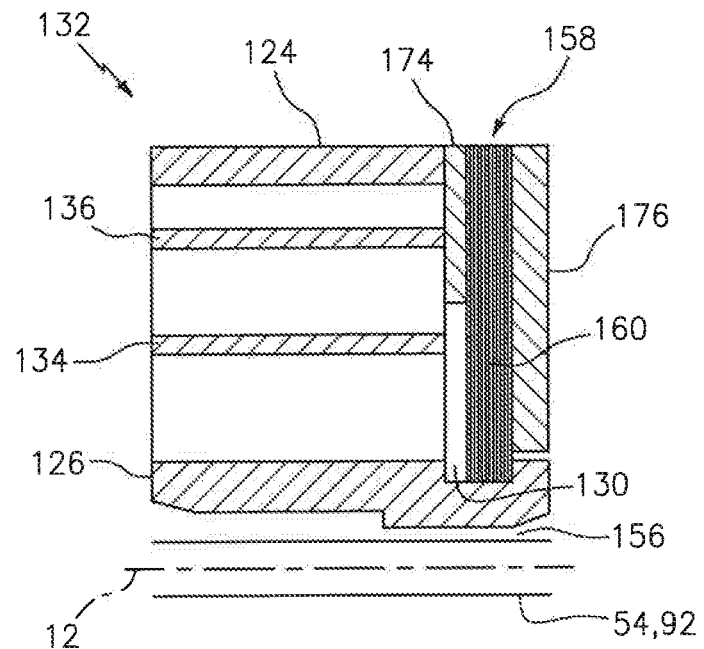
FIGS. 13 and 14 are side sectional illustrations of alternative portions of the non-contact seal of FIG. 10.
Figure 14:
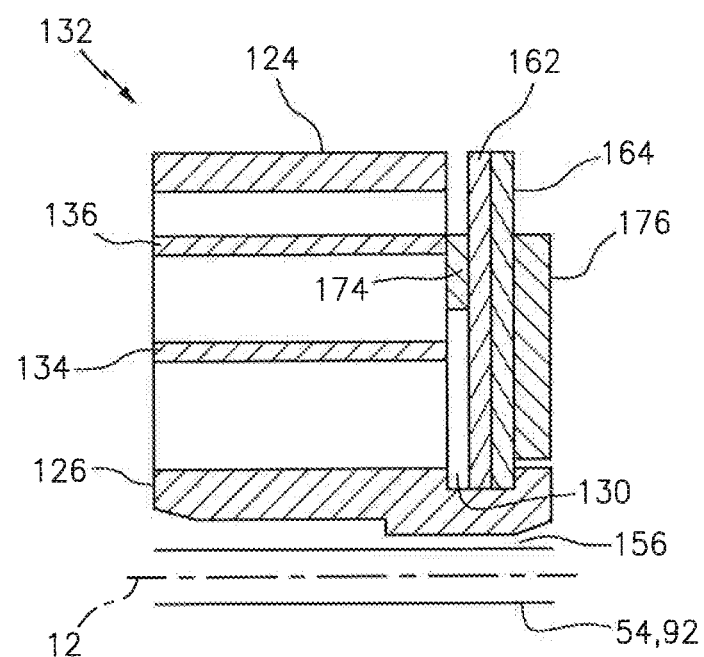
Figure 15:
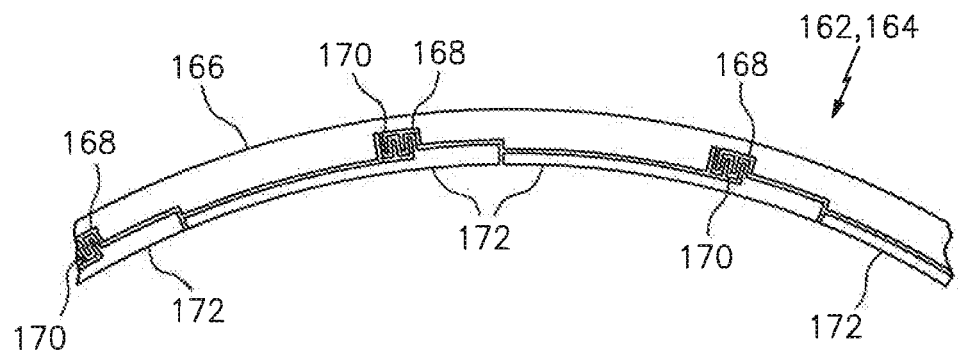
FIG. 15 is an end view illustration of a portion of a plate.

The non-contact seal 108 is also provided with a secondary seal which may take the form of a brush seal 158, as shown in FIG. 13, or a stack of at least two sealing elements oriented side-by-side and formed of thin sheets of metal or other suitable material as shown in FIGS. 14 and 15. The brush seal 158 is positioned so that one end of its bristles 160 extends into the slot 130 formed in the shoe 126. The bristles 160 deflect with the radial inward and outward movement of the shoe 126, in response to the application of fluid pressure as noted above, in such a way as to create a secondary seal of the gap 156 between the rotor 54 and base 124.

Referring now to FIGS. 14 and 15, the secondary seal of this embodiment may include a stack of at least two sealing elements 162 and 164. Each of the sealing elements 162 and 164 includes an outer ring 166 formed with a plurality of circumferentially spaced openings 168, a spring member 170 mounted within each opening 168 and a plurality of inner ring segments 172 each connected to at least one of the spring members 170. The spring member 170 is depicted in FIG. 15 as a series of connected loops, but it should be understood that spring member 170 could take essentially any other form, including parallel bands as in the spring elements 132. The sealing elements 162 and 164 are oriented side-by-side and positioned so that the inner ring segments 172 extend into the slot 130 formed in the shoe 126. The spring members 170 deflect with the radial inward and outward movement of the shoe 126, in response to the application of fluid pressure as noted above, in such a way as to create a secondary seal of the gap 156 between the rotor 54 and base 124. As such, the sealing elements 172 and 164 assist the spring elements 132 in maintaining the shoe 126 within design clearances relative to the rotor 54.

One or more of the spring elements 162 and 164 may be formed of sheet metal or other suitable flexible, heat-resistant material. The sealing elements 162 and 164 may be attached to one another, such as by welding and/or any other bonding technique, a mechanical connection or the like, or they may positioned side-by-side within the slot 130 with no connection between them. In order to prevent fluid from passing through the openings 168 in the outer ring 166 of each sealing element 162 and 164, adjacent sealing elements are arranged so that the outer ring 166 of one sealing element 162 covers the openings 168 in the adjacent sealing element 164. Although not required, a front plate 174 may be positioned between the spring element 132 and the sealing element 162, and a back plate 176 may be located adjacent to the sealing element 164 for the purpose of assisting in supporting the sealing elements 162, 164 in position within the shoe 126.

Figure 16:
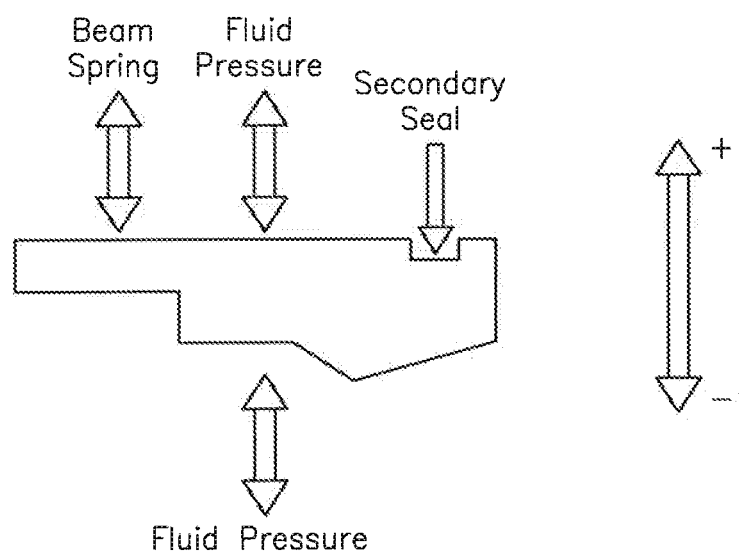
FIG. 16 is a force balance diagram of a shoe depicting aerodynamic forces, spring forces and secondary seal forces acting on the shoe.

During operation, the non-contact seal 108 is subjected to aerodynamic forces as a result of the passage of air along the surface of the shoes 126 and the respective linkage 92 and, more particularly, the respective seal portion 94. The operation of non-contact seal 108 is dependent, in part, on the effect of these aerodynamic forces tending to lift the shoes 126 radially outwardly relative to the surface of rotor 54, and the counteracting forces imposed by the spring elements 132 and the secondary seals (e.g., brush seal 158 or the stacked seal formed by plates 162, 164) which tend to urge the shoes 126 in a direction toward the rotor 54. These forces acting on the shoe 126 are schematically depicted with arrows in FIG. 16. These forces acting on the non-contact seal 108 may be balanced to ensure that nominal clearance is maintained.

Figure 17:
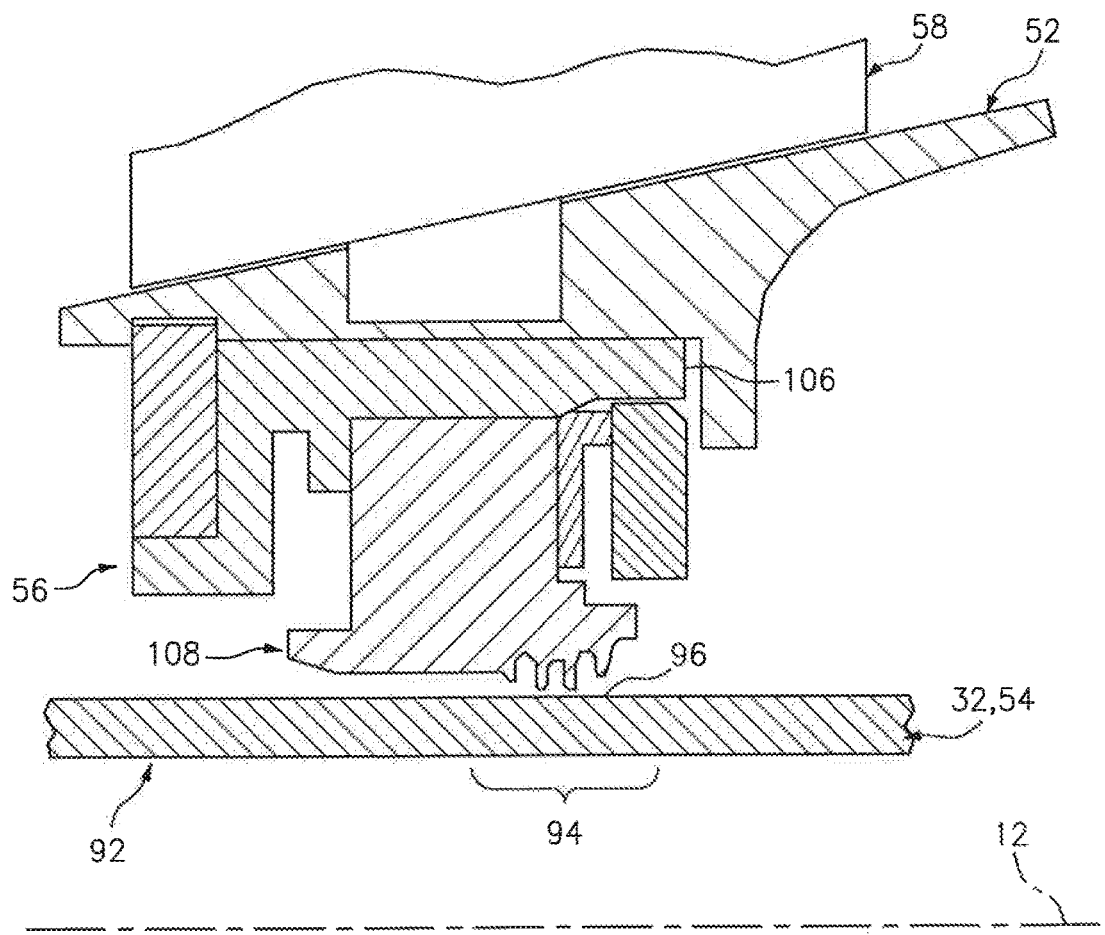
FIG. 17 is a side-sectional illustration of a portion of an alternative HPC section.

The present disclosure is not limited to the exemplary non-contact seal 108 described above. Various other non-contact seals are known in the art and may be reconfigured in light of the disclosure above to be included with the assembly 48 of the present disclosure. An example of such an alternative non-contact seal 108 is illustrated in FIG. 17. Other examples of non-contact seals are disclosed in U.S. Pat. Nos. 8,172,232; 8,002,285; 7,896,352; 7,410,173; 7,182,345; and 6,428,009, each of which is hereby incorporated herein by reference in its entirety. Still another example of a non-contact seal is a hydrodynamic non-contact seal.

The assembly 48 may be included in various aircraft and industrial turbine engines other than the one described above as well as in other types of rotational equipment; e.g., wind turbines, water turbines, rotary engines, etc. The assembly 48, for example, may be included in a geared turbine engine where a gear train connects one or more shafts to one or more rotors in a fan section, a compressor section and/or any other engine section. Alternatively, the assembly 48 may be included in a turbine engine configured without a gear train. The assembly 48 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment, the assembly comprising:

a circumferentially segmented stator;

a rotor radially within the stator including a disk, an annular linkage extending axially from the disk; and a seal assembly configured for substantially sealing a gap radially between the stator and the rotor, the seal assembly including a carrier and a non-contact seal seated with the carrier;

the carrier including a plurality of discrete carrier segments circumferentially arranged around the non-contact seal;

the non-contact seal comprising a base, a plurality of shoes and a plurality of spring elements;

the base seated with the carrier, and the base comprising a plurality of discrete base segments arranged circumferentially around a centerline;

the shoes circumferentially arranged around and radially adjacent the linkage;

each of the spring elements radially between and connecting a respective one of the shoes to the base, and each of the spring elements discrete and physically separated from circumferentially adjacent ones of the spring elements;

wherein a first of the discrete base segments supports a plurality of the shoes and a plurality of the spring elements.

2. The assembly of claim 1, wherein a first of the carrier segments circumferentially extends approximately one-hundred and eighty degrees around a centerline.

3. The assembly of claim 1, wherein each of the carrier segments is configured as an arcuate carrier segment.

4. The assembly of claim 1, wherein a first of the carrier segments is positioned circumferentially adjacent to and removably attached to a second of the carrier segments.

5. The assembly of claim 1, wherein a first of the carrier segments is circumferentially adjacent to a second of the carrier segments, and the first and the second carrier segments are mated together by a male-female connection.

6. The assembly of claim 5, wherein the first of the carrier segments includes a connector which projects laterally into an aperture in the second of the carrier segments to provide the male-female connection.

7. The assembly of claim 6, wherein the carrier further includes a fastener which secures the connector to the second of the carrier segments.

8. The assembly of claim 5, wherein the carrier further includes a connector which extends in a first lateral direction into an aperture in the first of the carrier segments to provide the male-female connection, and the connector extends in a second lateral direction into an aperture in the second of the carrier segments to provide a second male-female connection.

9. The assembly of claim 1, wherein the stator comprises a fairing configured to form an axial portion of an inner peripheral boundary of a core gas path through the rotational equipment, and the rotational equipment is configured as a gas turbine engine.

10. The assembly of claim 9, further comprising a variable vane including a shaft, wherein the shaft projects radially into an aperture in the fairing.

11. The assembly of claim 10, wherein the shaft further projects radially into an aperture in the carrier.

12. The assembly of claim 1, wherein the non-contact seal is positioned directly radially above and is axially aligned with a seal portion of the rotor with a cylindrical surface.

13. The assembly of claim 12, wherein the seal portion of the rotor is radially thicker than adjacent portions of the rotor.

14. The assembly of claim 12, wherein the seal portion of the rotor has a hardface which forms the cylindrical surface.

15. The assembly of claim 1, wherein the non-contact seal is a hydrostatic non-contact seal.

16. An assembly for a gas turbine engine, the assembly comprising:
an annular fairing;
a plurality of vanes arranged circumferentially around and engaged with the fairing;
a rotor including a disk, a plurality of rotor blades arranged around the disk, and an annular linkage extending axially from the disk; and
a seal assembly configured in a gap formed between the fairing and the linkage, the seal assembly including a base, a plurality of shoes and a plurality of spring elements;
the base mounted to the fairing and including a plurality of discrete base segments arranged circumferentially around a centerline;
the shoes circumferentially arranged around and radially adjacent the linkage; and
each of the spring elements radially between and connecting a respective one of the shoes to the base, and each of the spring elements discrete and physically separated from circumferentially adjacent ones of the spring elements;
wherein a first of the discrete base segments supports a plurality of the shoes and a plurality of the spring elements.

17. The assembly of claim 16, further comprising:
a carrier which mounts the base to the fairing, wherein the carrier includes a plurality of carrier segments circumferentially arranged around the centerline; and
a case circumscribing the vanes and the rotor, wherein the case includes plurality of case segments circumferentially arranged around the centerline, and wherein a seam between an adjacent pair of the case segments is circumferentially aligned with a seam between an adjacent pair of the carrier segments.

18. The assembly of claim 17, wherein a seam between an adjacent pair of the discrete base segments is circumferentially aligned with the seam between the adjacent pair of the carrier segments.

19. The assembly of claim 16, wherein a first of the discrete base segments is formed integral with the plurality of the shoes and the plurality of the spring elements as a monolithic body.

* * * * *